United States Patent Office 3,646,056
Patented Feb. 29, 1972

---

3,646,056
PROCESS FOR THE PRODUCTION OF 5,5-DIPHENYLHYDANTOIN
Winfried Kolbeck, Munich, and Friedrich Bayerlein, Munich-Obermenzing, Germany, assignors to Diamalt Aktiengesellschaft, Munich, Germany
No Drawing. Filed Feb. 10, 1970, Ser. No. 10,317
Int. Cl. C07d 49/32
U.S. Cl. 260—309.5                               9 Claims

ABSTRACT OF THE DISCLOSURE 5,5-diphenylhydantoin is produced in one step by reacting benzoin with 1–3 equivalents of urea in an alkaline medium in the presence of 0.5–4 equivalents of elemental sulfur at a temperature between 60° C. and the boiling point of the reaction mixture.

BACKGROUND OF THE INVENTION

Field of the invention

The invention relates to 5,5-diphenylhydantoin and more particularly to a method for producing same. This compound is in wide use in the form of its sodium salt as an anticonvulsant for grand mal epilepsy; see e.g. Merck Index 7th edition, pp. 381–2.

Prior art

There is a known method of manufacture of 5,5-diphenylhydantoin from benzil or benzilic acid by reaction with urea. According to the known method, the benzil or benzilic acid are obtained from benzoin in successive stages. Attempts have heretofore been made to combine this two-stage process into a single procedure, and produce the target compound from benzoin and urea by simultaneous oxidation in a single-pot process. Copper sulfate, potassium bromate and even air have been suggested as oxidizing agents for use in the process.

Those suggested methods, however, are characterized by considerable disadvantages. The processes employing copper sulfate or potassium bromate require the addition of large quantities of expensive chemicals which renders said processes uneconomical. The process involving oxidation by air is technically extremely difficult to carry out, which is particularly manifested by difficulty in reproducing results from one run to another.

SUMMARY OF THE INVENTION

According to the present invention, benzoin is directly transposed to 5,5-diphenylhydantoin by reacting same with 1–3 equivalents of urea in an alkaline medium (preferably potassium hydroxide) in the present of 0.5–4 equivalents of elemental sulfur at a temperature between 60° C. and the boiling point of the reaction mixture.

While the alkaline medium is generally an aqueous solution, of an alkali hydroxide such as KOH or NaOH it may also be a solution of said alkali in a mixed medium of water and in inert water miscible solvent such as a lower aliphatic alcohol, e.g. methanol or ethanol.

The 5,5-diphenylhydantoin can be recrystallized from ethanol to increase the purity thereof.

DETAILED DESCRIPTION OF THE INVENTION

In accordance with the process of the present invention, 5,5-diphenylhydantoin is produced in a single-stage process with excellently reproducible high yields from benzoin. The benzoin is reacted with urea in the presence of 0.5 to 4 equivalents of elemental sulfur at temperatures between 60° C. and the boiling point of the reaction mixture in an alkaline medium. Preferably, the temperature is between 80° C. and 100° C.

The advantage of this process resides in its amazing simplicity and the high yield of pure product attainable with excellent reproducibility. The single-stage process according to invention comprises three reaction stages:

(1) Condensation of benzoin with urea;
(2) Dehydrogenation to the benzil urea condensate with sulfur, and
(3) Transposition to 5,5-diphenylhydantoin using alkali.

These three reactions are given below:

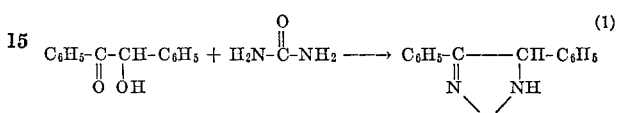

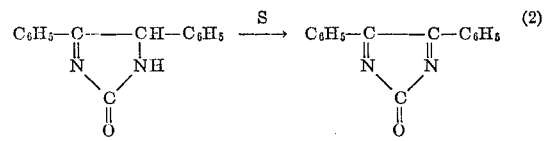

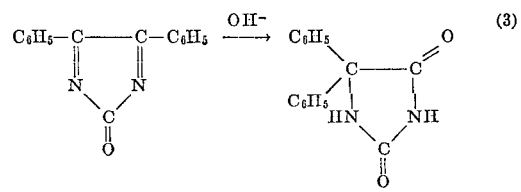

The alkali may be any alkali hydroxide and it is convenient to use KOH or NaOH in aqueous solution in a concentration of 10 to 40% or in solution in a mixture of water and an alcohol such as ethanol.

The ability of sulfur to act as a dehydrogenation agent in an aqueous medium at a relatively low temperature is wholly unexpected for the reason that sulfur customarily exhibits its ability to dehydrogenate only after having reached its melting point. That is, heretofore only liquid sulfur has been considered as a dehydrogenating agent.

In greater detail, according to the process of this invention, benzoin is transposed with 1 to 3 equivalents of urea in an aqueous alkali, preferably caustic potash solution, with 0.5 to 4 equivalents (preferably, 1 to 4) of elemental sulfur. The temperature of the reaction mixture should be between 60° C. and the boiling point of the reaction mixture, preferably between 80° and 100° C. The reaction proceeds for from 1 to 4 hours. For the dehydrogenation, usually 1 equivalent of sulfur is sufficient. However, to achieve some minor improvement in the yield, up to 4 equivalents of sulfur can be used. Higher concentrations than 4 equivalents of sulfur lead to a decreased yield. The transposition can be effected in aqueous medium, although mixtures of water with organic water-miscible solvents, preferably alcohols, are also suitable as solvents.

The proportions indicated in the following examples are parts by weight.

EXAMPLE I 25 parts of benzoin and 20 parts of urea were placed in a solution of 35 parts of potassium hydroxide in 125 parts of water for 4 hours at 93° C. and stirred to reaction in the presence of 11.3 parts (3 equivalents) of elemental sulfur. Subsequently, the mixture was filtered, diluted with an equal quantity of water and was to remove 6.8 parts of an insoluble residue with a M.P. 320° C. By acidifying the filtrate with hydrochloric acid 27.8 parts 5,5-diphenylhydantoin, M.P. 282–285° C. were obtained. (Yield 94% of the theoretical). Purification of the product by recrystallization from 500 parts of ethanol yielded 24 parts of 5,5-diphenylhydantoin, M.P. 290–296° C. (81% of theoretical).

EXAMPLE II 25 parts of benzoin and 20 parts of urea as in Example I were reacted with 7.6 parts of sulfur (2 equivalents) in a 25% caustic potash solution for 3 hours at 90° C. After dilution and filtration of the reaction product, 26 parts of crude product precipitated with hydrochloric acid (M.P. 283–287° C., 87% of theoretical). Recrystallization from ethanol gave 21 parts of 5,5-diphenylhydantoin, M.P. 290–292° C. (71% of theoretical).

EXAMPLE III 25 parts of benzoin, 20 parts of urea, 35 parts of potassium hydroxide in 150 parts of water/methanol (120:30) and 11.3 parts of sulfur (3 equivalents) were kept for 4 hours at 90° C. After dilution, filtration gave 6.3 parts of an insoluble residue and after acidifying the filtrate, a crude product, M.P. 283–286° C., was obtained, which after recrystallization from ethanol yielded 20.5 parts 5,5-diphenylhydantoin, M.P. 291–293° C. (69% of theoretical).

EXAMPLE VI 25 parts of benzoin, 20 parts of urea, 35 parts of potassium hydroxide, 150 parts of water and 15.2 parts of sulfur (4 equivalents) are kept at 90° C. for 4 hours. After filtration and acidification of the reaction mixture, a crude product with a M.P. of 284–287° C. is obtained, which after recrystallization from ethanol yields 24.5 parts (83% of theoretical) of 5,5-diphenylhydantoin (M.P. 291–293° C.).

EXAMPLE V 25 parts of benzoin, 20 parts of urea, 35 parts of potassium hydroxide, 150 parts of water and 3.8 parts of sulfur (1 equivalent) yielded after 4 hours at 90° C. and filtration and acidification 24.4 parts of colorless 5,5-diphenylhydantoin M.P. 293–297° C. (82.2% of theoretical). After recrystallization from ethanol, the yield was 20 parts of 5,5-diphenylhydantoin (68% of theoretical) M.P. 282–298° C. Evaporation of the mother liquor gave a further 1.2 parts with a M.P. 266–272° C.

EXAMPLE VI

The same reactants as in Example V were kept at 90° C. for only 1 hour. The crude yield of colorless 5,5-diphenylhydantoin amounted to 24.3 parts (81.7% of theoretical) M.P. 293–298° C. After recrystallization from ethanol the yield of pure material amounted to 19.8 parts (66.7% of theoretical) with a M.P. 293–297° C.

EXAMPLE VII 25 parts of benzoin, 20 parts of urea, 35 parts of potassium hydroxide, 150 parts of water and 3.42 parts of sulfur (0.9 equivalent) were held for 2 hours at 100° C. After filtration and acidification of the reaction mixture, 23.8 parts (80% of theoretical) of a colorless crude product M.P. 293–298° C. were obtained. This product was of high purity, and after recrystallization from ethanol yielded 22.6 parts (76% of theoretical) 5,5-diphenylhydantoin M.P. 294–298° C.

EXAMPLE VIII 25 parts of benzoin, 20 parts of urea, 35 parts of potassium hydroxide in 150 parts of water with 11.4 parts of sulfur (3 equivalents) were kept for 4 hours at 60° C. Proceeding as in Example I led to the obtention of 27.9 parts of crude 5,5-diphenylhydantoin (94% of theoretical) M.P. 286–290° C. Recrystallization from ethanol yielded 22.3 parts of pure product M.P. 293–297° C. (75% of theoretical).

EXAMPLE IX 25 parts of benzoin, 20 parts of urea, 35 parts of potassium hydroxide in 150 parts of a mixture of 100 parts of methanol and 50 parts of water in the presence of 3.8 parts of sulfur (1 equivalent) were boiled for 1 hour under reflux (temperature 78° C.). The clear reaction solution was subsequently diluted with water as in Example I. The resultant deposit was filtered off and the filtrate acidified as in Example I. The yield was 23.2 parts of colorless, 5,5-diphenylhydantoin (78% of theoretical) M.P. 293–297° C.

EXAMPLE X

The same reactants were used as in Example IX in 150 parts of a mixture of 75 parts of ethanol and 75 parts of water. Working-up yielded 23.8 parts of colorless 5,5-diphenylhydantoin (80% of theoretical) M.P. 293–297° C.

We claim:
1. A process for producing 5,5-diphenylhydantoin from benzoin, said process comprising reacting benzoin with 1–3 equivalents of urea in an alkaline medium in the presence of 0.5 to 4 equivalents of elementals sulfur at a temperature between 60° C. and the boiling point of the reaction mixture.

2. A process according to claim 1 wherein 1 to 4 equivalents of elemental sulfur are used.

3. A process according to claim 1 wherein reacting is effected at 80°–100° C.

4. A process according to claim 1 wherein reacting is effected for 1 to 4 hours.

5. A process according to claim 1 wherein the alkaline medium is a solution of an akali hydroxide.

6. A process according to claim 5 wherein the alkali hydroxide is potassium hydroxide.

7. A process according to claim 6 wherein the alkali hydroxide is in solution in water or a mixture of water and a lower alkanol as an inert water-miscible solvent.

8. A process according to claim 7 wherein the inert water-miscible solvent is ethanol.

9. A process according to claim 1 wherein the alkaline medium has an alkali concentration of from 10 to 40%.

References Cited

UNITED STATES PATENTS

| 2,242,775 | 5/1941 | Bywater | 260—309.5 |
| 2,684,371 | 7/1954 | Levy | 260—309.5 |

FOREIGN PATENTS

| 32,313 | 10/1954 | Germany | 260—309.5 |
| 45,576 | 4/1966 | Germany | 260—309.5 |
| 1,209,117 | 1/1966 | Germany | 260—309.5 |

OTHER REFERENCES

Sikdar el al., Chem. Abst., vol. 43, column 1045 (1949), QD1, A51.

NATALIE TROUSOF, Primary Examiner